United States Patent Office 3,308,063
Patented Mar. 7, 1967

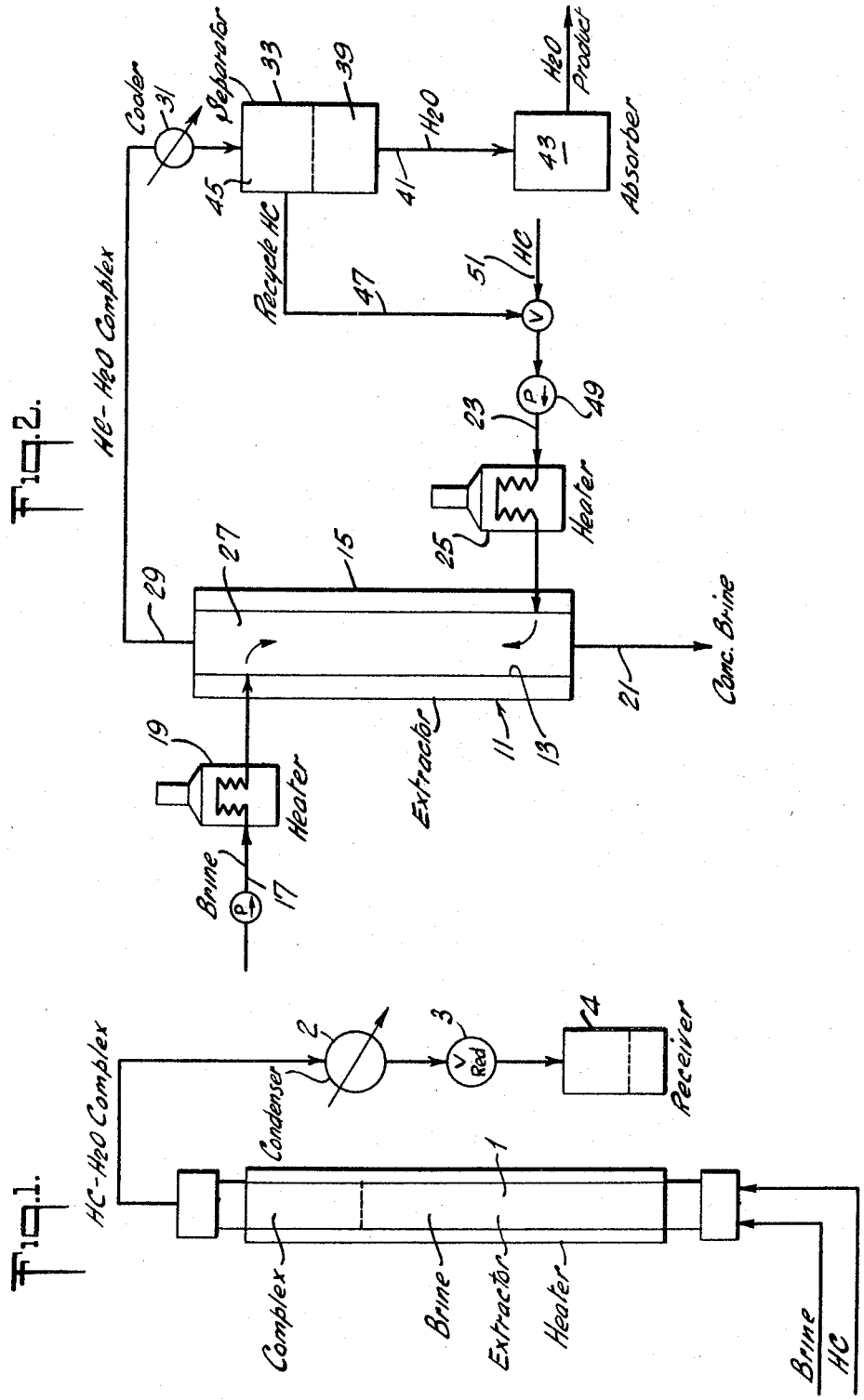

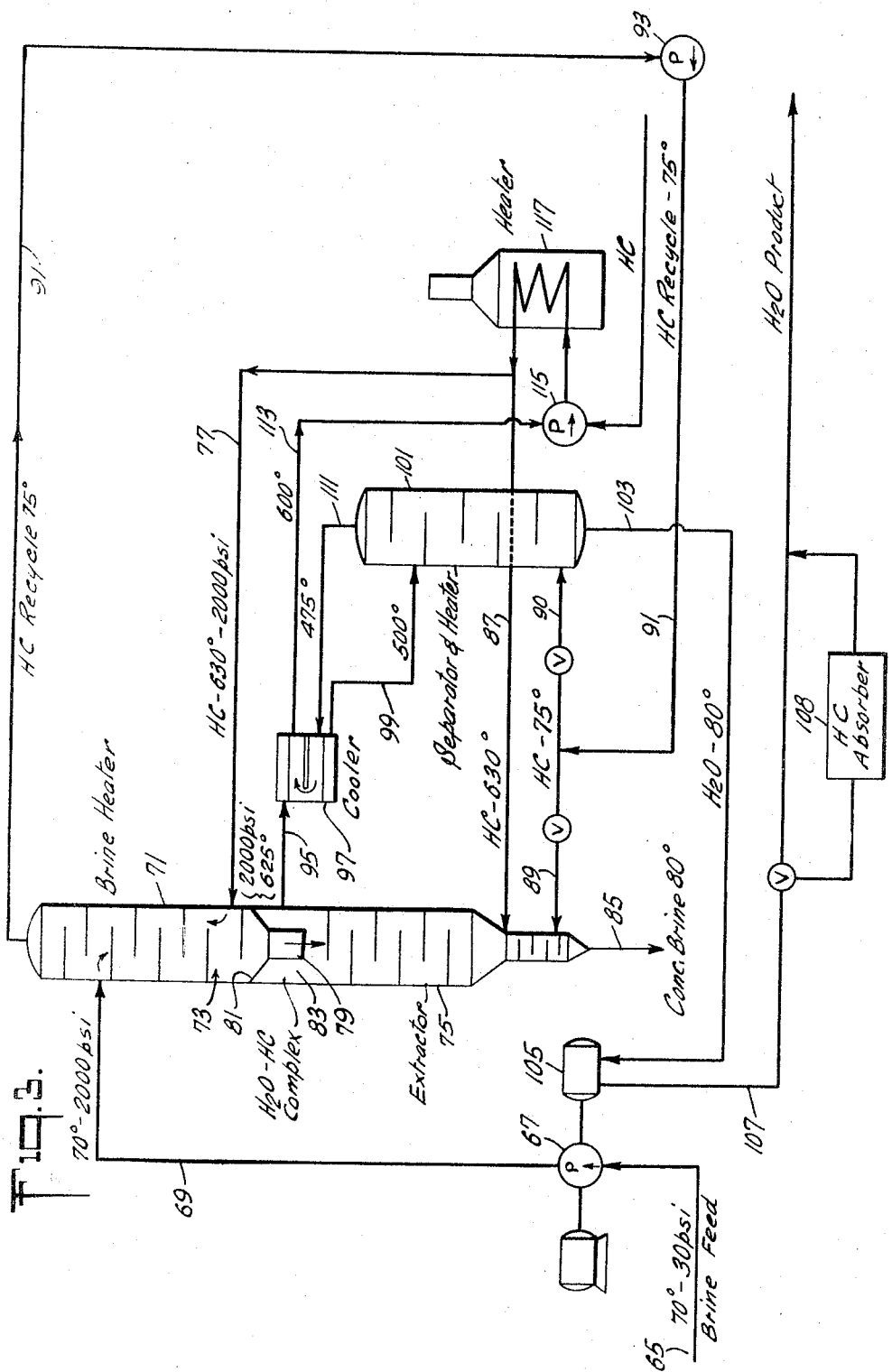

3,308,063
REMOVING WATER FROM BRINE
Howard V. Hess, Glenham, and Frank E. Guptill, Jr., Fishkill, N.Y., assignors to Texaco Inc., New York, N.Y., a corporation of Delaware
Filed Sept. 16, 1963, Ser. No. 308,930
29 Claims. (Cl. 210—59)

This application is a continuation-in-part of our co-pending patent application, Serial No. 144,241 filed October 10, 1961, now abandoned.

The present invention relates to a novel process and apparatus for separating fresh water from brine. The process is applicable to the recovery of salt-free water from brines and to the concentration of various brines for the recovery of inorganic compounds contained therein.

In one of its more specific aspects, the present invention is concerned with a process for separating water from brine wherein a hot hydrocarbon liquid under pressure is brought into contact with heated brine to form a complex substantially free from inorganic compounds with water from the brine, separation of the complex from the residual brine, decomposition of the complex into its constituents. The term "brine" is used in a broad sense to denote the entire range of concentrations of water soluble inorganic compounds in water, for example, natural saline water containing sodium chloride, including brackish water, sea water, and saturated or nearly saturated brines, such as the brine in Great Salt Lake or brines obtained from wells. In addition to sodium chloride-containing solutions, other brines to which the process may be applied include aqueous solutions of dissolved mineral salts, for example, halides, carbonates and sulfates of sodium, potassium, lithium, calcium, magnesium, zinc and copper.

The present invention involves a novel desalination process which is dependent upon contact of hot brine with a hot hydrocarbon liquid characterized by the property of extracting a greater amount of water at a high temperature (e.g., at a temperature of 500° F. or above) than at a lower temperature, whereby water is extracted from the brine by the hydrocarbon and forms a complex which is immiscible with the residual brine and may be separated therefrom by gravity. After separation from the residual brine, the complex is decomposed by reducing the temperature sufficiently below the extraction temperature to cause the hydrocarbon and water to separate from one another as two liquid phases; the water phase or the residual brine may be product and the hydrocarbon phase is recycled to the extraction zone. The basic process is disclosed in the copending U.S. patent application of Howard V. Hess, Serial No. 144,240, filed October 10, 1961. The present application is directed to improvements in the basic process.

The term "complex" is used herein to designate the solution of water in hydrocarbon liquid, especially the extract leaving the extraction zone, since it is not entirely certain at this time whether it is a true solution of water in hydrocarbon liquid or a hydrocarbon solution containing a hydrate of the water and hydrocarbon.

For greatest efficiency the present process should be operated at a temperature above 500° F. for the extraction step, after which the temperature is reduced below the extraction temperature for the phase separation step, advantageously by at least 50° below the extraction temperature to assure breaking out the major part of the water. When using aliphatic hydrocarbons, somewhat greater extraction efficiency is obtained if the temperature is kept above 550° F.

By way of illustration, n-decane has the property of extracting 22.2% its weight of water at 575° F., 9% at 550° F., and only 3.3% at 500° F. Consequently, with the extraction process operating at 575° F., and the decomposition step at 500° F., there is a recovery of water in the amount of about 19 percent of the n-decane.

The operating pressure of the extraction step must be sufficiently high to maintain both the brine and the hydrocarbon in a liquid condition at the operating temperature, normally greater than 1000 p.s.i.g. and sometimes as high as 3000 p.s.i.g. Usually the phase break and separation part of the system is at the same operating pressure.

The upper temperature limit should be below the temperature at which vaporization can occur in the extractor to ensure that the fluids in the system are in liquid phase.

Normally liquid hydrocarbons are generally suitable for use in the process of this invention. Hydrocarbons and mixtures of hydrocarbons containing from 6 to 30 carbon atoms per molecule may be used. Hydrocarbons of 8 to 20 carbon atoms, particularly, 9 to 12, per molecule are preferred. Various petroleum fractions including kerosene, naphtha, odorless spirits, gasoline, and lubricating oils may be used in the process. Examples of individual hydrocarbon types which can be used in the process of the present invention, either alone or in admixture with one another, are the aliphatic hydrocarbons, including hexane, 2,3-dimethylbutane, heptanes, octanes, isooctane, monanes, decanes, propylene tetramer, hexadecane, 2-methyl-1-pentene, etc.; naphthenic hydrocarbons, e.g., methylcyclopentane, cyclohexane, methylcyclohexane, dimethylcyclohexane, ethylcyclohexane, tetralin, isopropylcyclohexane, cyclohexene, pinene, etc.; and aromatic hydrocarbons, e.g., benzene, cumene, xylenes, methylnaphthalenes, etc.

Preferred petroleum fractions useful in the present process include normal paraffin hydrocarbons containing 10 to 12 carbon atoms per molecule; isoparaffin hydrocarbons of 12 carbon atoms per molecule, e.g., the bottoms fraction obtained from alkylation of butylenes with isobutane; Udex extract, an aromatic hydrocarbon fraction consisting essentially of hydrocarbons of 9 to 10 carbon atoms per molecule obtained on extraction of petroleum naphtha with a mixture of diethylene glycol and water; propylene tetramer; gasoline fraction hydrocarbons of 10 to 12 carbon atoms per molecule; and naphthenes containing 9 to 10 carbon atoms per molecule.

In the drawings:

FIGS. 1 and 2 are schematic flow diagrams showing simple arrangements of apparatus for performing the invention by co-current flow operation, and by counter-current operation, respectively; and FIG. 3 is a schematic flow diagram showing an arrangement of apparatus for carrying out the process of this invention.

Referring to FIG. 1, brine and hydrocarbon liquid are fed at a high pressure such as 2000 p.s.i.g. into the bottom of a long narrow pipe 1, in the lower portion of which the temperature is maintained at a high value such as above 550° F. by a surrounding electric heater, whereupon a complex of salt-free water with the hydrocarbon is formed and accumulates in an unheated upper portion of the pipe. This complex flows out the top and through a heat exchanger 2 wherein its temperature is reduced well below 550° F., for example, to atmospheric temperature, to decompose the complex and form a water phase and a hydrocarbon phase. The stream then passes through a pressure reducer 3 wherein pressure is reduced to atmospheric, and enters a collecting vessel 4.

Instead of feeding makeup brine to extractor 1, a batch of brine may be extracted, with its level gradually dropping and its salt content increasing.

Product water containing less than 100 p.p.m. salt was obtained by treating 500 cc. batches of real and synthetic sea water (SW) containing about 3% salt in an extractor 1⅛" inside diameter and 60 inches long containing 29 inches of berl saddles, using the apparatus shown in FIG. 1. Makeup sea water in an amount equal to product water was added in some examples as indicated. Separation was accomplished by cooling the extract to room temperature. Conditions are set forth in Table I below:

TABLE I

| Hydrocarbon | HC Rate, cc./hr. | Extractor | | Water Product, cc./hr.* | Vol. Percent* Water in Extract |
|---|---|---|---|---|---|
| | | Temp., °F. | Pres., p.s.i.g. | | |
| Odorless spirits a | 601 | 625 | 2,500 | b c 165 | 21.5 |
| Kerosene | 600 | 630 | 2,100 | b 230 | 27.8 |
| Do | 150 | 500 | 800 | 6.5 | 4.3 |
| Cumene | 600 | 625 | 2,100 | b d 335 | 35.9 |
| o-Xylene | 300 | 500 | 2,000 | 20 | 6.7 |
| Do | 300 | 575 | 2,000 | 35 | 11.6 |
| Do | 300 | 625 | 2,100 | 72 | 24.0 |
| Do | 300 | 640 | 2,650 | 98 | 32.6 |

*Averages.
a Alkylation bottoms: $C_{12}$ and higher isomeric paraffins.
b Equivalent amount of SW added.
c 15 hour period.
d 16 hour period.

The improvement effected by increasing temperature is illustrated above, o-xylene, showing a 5-fold increase in product when operating at 640° F. as compared to 500° F.

Referring to FIG. 2, there is shown a continuous extractor 11 comprising a central column 13 comprising an extraction zone surrounded by a jacket 15 through which hot gases may be passed, if desired, or which can be filled with a heat insulating material, alternatively. Jacket 15 also may be used for cooling where the heat of solution is such that temperature tends to rise too high.

Brine from a supply line 17 is passed at a high pressure such as 2000 p.s.i.g. through a heater 19 wherein its temperature is raised to a high level such as 600° F. without vaporization, and is then passed into the upper half of column 13 at a point near its top so as to flow downwardly and then out the bottom through a discharge conduit 21. The leaving brine is quite concentrated, containing as much as 10-20% salt.

A suitable hydrocarbon, such as kerosene, is passed at a similarly high pressure by way of a conduit 23 through a second heater 25 wherein its temperature is raised to a high level such as 630° F., after which it is passed into the lower half of column 13 near its bottom and, due to its lower specific gravity than brine, flows upwardly in countercurrent direct contact with the downwardly flowing brine. As the two liquids pass in contact with one another, a complex of hydrocarbon and water (which is substantially free from salt) is formed and, due to its lower specific gravity than the brine, accumulates in the space 27 at the top of column 13 above the brine inlet.

The complex flows out of the top of column 13 through a conduit 29 and passes through a cooler 31 to effect phase separation, and then into a separator 33.

In the separator 33 there is formed a body of liquid comprising a lower phase 39 which is almost pure water, and an upper phase 45 which is almost pure liquid hydrocarbon. The water is drawn off the bottom through a conduit 41 and recovered as product. Ordinarily this water is free enough from hydrocarbon impurity so as to be useful for most industrial processes. However, potability is assured by passing the water through an absorber 43 containing absorbent such as activated carbon which adsorbs hydrocarbon impurities.

The upper layer 45 of separated hydrocarbon is passed through a conduit 47, pump 49, and heater 25 back into the extractor 11 for reuse in the process. Makeup hydrocarbon is added through a supply line 51 as needed.

Product water containing less than 100 p.p.m. salt was obtained by countercurrent extraction of sea water (SW) containing about 3% salt in an unpacked extractor 1½ inches inside diameter and 60 inches long. Separation was accomplished by cooling to room temperature. Pressure was reduced to atmospheric, and there was no recycle of hydrocarbons. Conditions are set forth in Table II below:

TABLE II

| Hydrocarbon | HC Rate, cc./hr. | SW Rate, cc./hr. | Extractor | | Products | |
|---|---|---|---|---|---|---|
| | | | Temp., °F. | Pres., p.s.i.g. | Water, cc./hr. | Brine, cc./hr. |
| Benzene | 3,000 | 520 | 500 | 1,800 | 480 | 40 |
| Cumene | 600 | 236 | 540 | 2,000 | 151 | 85 |
| o-Xylene | 1,600 | 460 | 575 | 2,850 | 360 | 100 |
| Odorless spirits* | 3,250 | 422 | 584 | 2,000 | 364 | 58 |
| 50% n-decane, 50% n-undecane | 1,550 | 420 | 611 | 2,500 | 378 | 42 |

*Alkylation bottoms: $C_{12}$+isomeric paraffins.

"Norwalk" sea water containing about 3% salt was extracted with methylcyclohexane in an unpacked tower having an inside diameter of 1½ inches and a length of 72 inches.

The following table lists the conditions and results.

TABLE III.—CONTINUOUS EXTRACTION OF FRESH WATER FROM SEA WATER WITH METHYLCYCLOHEXANE IN A 1½" X 72" TOWER

Temp. °F. _____ 575
Pressures, p.s.i.g. _____ 2000
Charge rates:
    MCH cc./hr. _____ 585
    Sea water cc./hr. _____ 124
Duration, hr. _____ 25
Vol. percent water in extract _____ 13.65
Vol. percent fresh water extracted _____ 51.3

With reference to FIG. 3, an efficient plant for recovering fresh water from brine is illustrated. Temperatures and pressures exemplify operation with n-decane as the extractant. Brine, at ambient temperature, for example, about 70° F. and a pressure of 30 p.s.i.g. is supplied through a line 65 to a pump 67 which raises the pressure to operating pressure, e.g., 2000 p.s.i.g., and delivers the brine through a line 69 into the upper part of a brine heater 71 comprising a vertical cylindrical column. The brine heater 71 is an integral part of a long column 73 which, at the lower part thereof, also comprises an extractor 75. Hot hydrocarbon liquid can be introduced into column 73 through line 77, line 87, or both simultaneously.

The brine flows downwardly in heater 71 and comes into intimate direct contact with an upwardly flowing stream of hot hydrocarbon liquid, e.g., n-decane, which may be supplied by line 77, entering the lower part of brine heater 71 at a temperature much hotter than the entering brine, e.g., 630° F. Consequently, the brine is heated to a high temperature of about 625° F. while the hydrocarbon is cooled to about 75° F. This type of direct heating almost entirely eliminates the problems of scale deposition and metal corrosion encountered with indirect heaters.

Complex formed by the hot hydrocarbon liquid and hot brine is decomposed on cooling as the hydrocarbon flows up through the heater and is cooled by the downwardly flowing brine.

Direct heating can be accomplished in several stages using either co-current flow or countercurrent flow.

The hot brine from heater 71 flows down through a downcomer 79 and enters the extractor 75 at a point sufficiently below a transverse partition or tray 81 to provide an annular space 83 from the accumulation of complex substantally free from brine. Due to its higher specific gravity than the hydrocarbon liquid, the brine flows down through the extractor, growing gradually richer in salt content, and leaves the bottom through a conduit 85. Meanwhile, hydrocarbon liquid is introduced at a high temperature, e.g., 630° F., to a point near the bottom of the extractor by means of a line 87 and flows upwardly in direct contact with the brine to form a complex therewith which accumulates in space 83. Hydrocarbon liquid is also supplied to the extractor at a point below the entrance of line 87 by means of a second supply line 89 carrying hydrocarbon liquid at a low temperature and high pressure, such as about 75° F. and 2000 p.s.i.g., which is supplied by a recycle line 91 from the top of brine heater 71. As the cool hydrocarbon liquid from line 89 rises through the lower part of extractor 75 in contact with residual hot brine, it cools the brine while its own temperature rises to the point where it also extracts water from the brine.

As indicated above, all of the hydrocarbon liquid required for the process may be introduced into column 73 through either line 77 or through line 87. In a preferred embodiment, as described hereinafter, hot hydrocarbon liquid is supplied to the column through both lines 77 and 87, the hydrocarbon entering through line 77 serving to preheat the brine to approximately the required temperature for extraction, e.g., 625° F., and the amount of hydrocarbon supplied to the column through line 87 serving to form a sufficient amount of complex with the preheated brine to extract water from the brine.

When all of the hot hydrocarbon liquid is introduced into column 73 through line 77, part of the hydrocarbon serves to heat the brine in heater 71, as determined by the rate of withdrawal of hydrocarbon through line 91 while the remainder flows down through downcomer 79 together with heated brine to form the complex required for extraction of water from the brine.

Similarly, when all of the hot hydrocarbon is introduced to the column through line 87, part of the complex is withdrawn from the column through line 95 and treated for recovery of desalted water therefrom while the remainder flows up through downcomer 79, countercurrent to hot brine from heater 71, and, in flowing upwardly through heater 71, is decomposed on cooling and supplies the heat required for preheating the incoming brine to the temperature required for complexing, e.g., 625° F.

Hydrocarbon-water complex drawn from the annular accumulator space 83 by way of a line 95 at about 625° F. passes through a heat exchanger 97 wherein its temperature is reduced to a value at which phase separation occurs, (e.g., 500° F.), and then passes through a line 99 into an intermediate portion of a vertical cylindrical vessel 101 wherein desalted water accumulates in the lower portion and hydrocarbon liquid in the upper portion. The part of vessel 101 above the point of entry of line 99 may be considered a phase separator; and the part below line 99 may be considered a direct heat exchanger.

Desalted water flows out the bottom of vessel 101 by way of a conduit 103 and passes through a turbine 105 and thence is delivered through a line 107 as substantially salt-free water product. Turbine 105 uses the high pressure energy of the water to help drive pump 67, while the water pressure dropes to atmospheric from about 2000 p.s.i. It sometimes happens that the water product contains a small amount of hydrocarbon which may adversely affect its value for some uses, such as potability, in which case the water is passed through an absorber 108 containing an absorbent material, such as activated carbon, which extracts residual hydrocarbons.

Desalted water leaving the bottom of vessel 101 is quite cool as the result of direct heat exchange with cool hydrocarbon liquid from recycle line 91, most of which enters vessel 101 through line 90. Normally, the split of recycle hydrocarbon between lines 89 and 90 is roughly proportional to the volumes of liquid leaving through lines 85 and 103, e.g., if 5 volumes of brine leave through line 85 to each 95 volumes of water leaving in line 103, then the split is 5% to line 89 and 95% to line 90.

Hot hydrocarbon liquid from the upper portion of vessel 101 (including heated hydrocarbon from line 90) is passed by way of a line 111 through the heat exchanger 97 wherein it acts to reduce the temperature of the complex, and at the same time is reheated, e.g., to 600° F., before leaving through a line 113 and flowing through a pump 115 to a fired indirect heater 117. In heater 117, the temperature is raised to a higher level, e.g., 630° F., and the effluent hydrocarbon liquid is passed at a high pressure, e.g., about 2000 p.s.i.g., to either or both of conduits 77 and 87 for introduction into column 73, as described previously.

If desired, the brine heater 71 can be operated with recycle of organic liquid in a closed loop, using one liquid solely for heating the brine and a different one for extraction. For example, a paraffin hydrocarbon could be used for heating, and an aromatic hydrocarbon, for extraction.

The process described in connection with FIGS. 1–3 can be operated with either the brine or the hydrocarbon liquid as the continuous phase in the extractor 75 and in the brine heater 71 of FIG. 3. It is particularly advantageous to operate with hydrocarbon liquid as the continuous phase because scale accumulation (from $CaSO_4$ and $MgSO_4$ in the brine) is prevented, and because corrosion of metal is reduced when the metal walls are wet with hydrocarbon.

On the other hand, superior heat exchange is obtained when the continuous phase liquid is that liquid which is used in smaller volume, which is usually the brine; (this is because there are formed more bubbles of the larger volume liquid than bubbles of the smaller volume liquid in the reverse arrangement).

It should be noted that when the preheat hydrocarbon liquid entering through line 77 is at a temperature below the temperature of the complex withdrawn through line 95, e.g., below 500° F., a higher temperature is required for the hydrocarbon entering through line 87, e.g., 700° F.

While the invention has been described above with its primary object the recovery of salt-free water from brine, it is evident that the highly concentrated brine leaving the bottom of the extractor may have commercial value and may be the primary product of the process or a valuable by-product. Brines contain sodium chloride and often contain such other commercially valuable salts, such as magnesium, bromine and iodine salts which may be extracted from the concentrated brine product of the process.

We claim:

1. A process for extracting water from brine comprising passing relatively cool brine into direct counter-current contact with relatively hot hydrocarbon liquid in a contacting zone whereby said hydrocarbon is cooled and said brine is heated to an elevated temperature at a pressure sufficient to maintain said brine in liquid phase at said elevated temperature, contacting resulting heated brine with a further amount of hot hydrocarbon liquid thereby extracting salt-free water from said brine, withdrawing hot hydrocarbon liquid containing extracted water from contact with resulting concentrated brine and cooling said withdrawn hydrocarbon liquid containing said water by an amount sufficient to effect the formation of separate water and hydrocarbon liquid phases, and removing said water phase from said hydrocarbon phase.

2. A process according to claim 1 wherein said elevated temperature is at least 500° F. but below the apparent critical temperature of the hydrocarbon liquid.

3. A process according to claim 2 wherein said hot hydrocarbon liquid containing extracted water is cooled by at least 50° F.

4. A process according to claim 1 wherein said hydrocarbon liquid consists essentially of hydrocarbons containing not less than 6 and not more than 30 carbon atoms per molecule.

5. A process according to claim 1 wherein said hydrocarbon liquid is maintained as a continuous phase in said contacting zone.

6. A process according to claim 1 wherein said brine is present as a continuous phase in said contacting zone.

7. A process according to claim 1 wherein said separate water phase is further cooled by direct countercurrent contact with relatively cool hydrocarbon liquid simultaneously heating said hydrocarbon liquid.

8. A process according to claim 7 wherein hydrocarbon liquid heated by direct contact with said separated water phase is passed in indirect heat exchange relation with said hot hydrocarbon liquid containing water.

9. A process in accordance with claim 8, also comprising reheating hydrocarbon liquid coolant following said indirect heat exchange and returning at least part thereof to said contacting zone.

10. A process according to claim 1 wherein said concentrated hot brine is cooled by direct countercurrent contact with relatively cool hydrocarbon liquid effecting simultaneous cooling of said brine and heating of said hydrocarbon liquid.

11. A process for extracting water from brine which comprises introducing relatively cool brine into an upper portion of a vertically elongated contacting zone, introducing hot hydrocarbon liquid into an intermediate portion of said contacting zone, withdrawing concentrated brine from a lower portion of said contacting zone, withdrawing cooled hydrocarbon from the upper portion of said contacting zone above the point of introduction of said brine, withdrawing hot hydrocarbon containing water extracted from said brine from an intermediate portion of said contacting zone, cooling said withdrawn hot hydrocarbon containing water by an amount sufficient to effect separation of water therefrom as a separate water phase, and removing said water phase from said hydrocarbon.

12. A process according to claim 11 wherein relatively cool hydrocarbon liquid is introduced into the lower portion of said contacting zone below the points of introduction and withdrawal of hot hydrocarbon liquid and of hydrocarbon liquid containing water into contact with said concentrated brine effecting cooling of said brine and heating of said cool hydrocarbon liquid.

13. A process according to claim 11 wherein hot hydrocarbon liquid is introduced into the mid-portion of said contacting zone at a point above the point of withdrawal of said hot hydrocarbon containing water extracted from said brine.

14. A process according to claim 11 wherein hot liquid hydrocarbon is introduced into said contacting zone at a point below the point of withdrawal of said water-hydrocarbon complex and said hot hydrocarbon flows countercurrent to the flow of hot brine in the lower portion of said contacting zone thereby effecting countercurrent extraction of salt-free water from said brine.

15. A process according to claim 11 wherein part of said hot liquid hydrocarbon is introduced into said contacting zone above the point of withdrawal of said hot hydrocarbon liquid containing extracted water and part is introduced below said point of withdrawal.

16. A process in accordance with claim 11, also comprising passing part of the cooled hydrocarbon liquid from the upper portion of said contacting zone into the lower portion of said contacting zone near the bottom thereof into direct countercurrent contact with hot concentrated brine to cool said concentrated brine and passing another part of said cooled hydrocarbon liquid into direct countercurrent contact with said separate water phase thereby cooling said water phase and heating said hydrocarbon liquid to an elevated temperature which is lower than the temperature of said hot hydrocarbon containing water withdrawn from said contacting zone and then passing said heated hydrocarbon liquid in direct heat exchange with said hot hydrocarbon liquid containing water as coolant therefor to effect separation of water therefrom as said separate liquid phase.

17. A process according to claim 11 wherein said hydrocarbon liquid consists essentially of isoparaffin hydrocarbons of at least 12 carbon atoms per molecule obtained as bottoms from the alkylation of butylenes with isobutane.

18. A process according to claim 11 wherein said hydrocarbon liquid consists essentially of hydrocarbons containing not less than 10 and not more than 12 carbon atoms per molecule.

19. A process according to claim 11 wherein said hydrocarbon liquid consists essentially of aromatic hydrocarbons of 9 to 10 carbon atoms per molecule.

20. A process according to claim 11 wherein said hydrocarbon liquid consists essentially of propylene tetramer.

21. A process for extracting water from brine which comprises introducing relatively cool brine into the upper end of a vertical contacting zone, introducing hot immiscible organic liquid having a specific gravity less than said brine and characterized by the ability to extract more water from said brine at a higher temperature than at a lower temperature into a lower portion of said contacting zone whereby said brine is heated to elevated temperature by direct heat exchange with said hot organic liquid and water is extracted from said brine by said hot organic liquid, withdrawing cooled organic liquid from the upper end of said contacting zone, withdrawing part of said hot organic liquid containing water extracted from said brine from an intermediate portion of said contacting zone, cooling said withdrawn hot organic liquid containing water and effecting separation of water therefrom as a separate water phase, recovering said water phase substantially free from said organic liquid, introducing cool organic liquid in a minor amount into the lower portion of said contacting zone below the points of introduction of the hot organic liquid and withdrawal of hot organic liquid containing extracted water thereby effecting cooling of said brine and concomitant heating of said organic liquid by direct countercurrent heat exchange, and withdrawing cooled concentrated brine from the lower portion of said contacting zone.

22. A process according to claim 21 wherein said brine is present as a continuous phase in said extraction contacting zone.

23. A process according to claim 21 wherein said organic liquid is maintained as a continuous phase in said contacting zone.

24. Apparatus for extracting water from brine with an immiscible organic liquid solvent having a specific gravity less than one at a temperature well above said brine temperature which comprises, in combination:
  (a) a brine preheater vessel;
  (b) means for introducing a stream of cool dilute brine into an upper portion of said preheater vessel to flow down through said vessel;
  (c) means for introducing a stream of hot organic liquid into a lower portion of said vessel to flow upwardly in direct heating contact with said brine;
  (d) means for withdrawing resulting cooled organic liquid from the upper portion of said preheater vessel;
  (e) an extractor vessel;
  (f) means for withdrawing heated brine from the lower portion of said brine preheater and for introducing said heated brine into said extractor vessel near but below the top thereof, to flow downwardly therein;
  (g) means for introducing a stream of hot organic liquid into a lower portion of said extractor vessel to flow upwardly in contact with said brine and form a complex therein;
  (h) means for withdrawing concentrated brine from the lower portion of said extraction vessel;
  (i) means for withdrawing said complex from an upper portion of said extractor vessel above the point of introduction of heated brine thereto;
  (j) means for cooling the complex so withdrawn and effecting a liquid-liquid phase separation therein; and
  (k) separator means for separating the resulting organic liquid phase from the resulting liquid water phase.

25. Apparatus in accordance with claim 24, also comprising means for reheating the separated organic phase; and means for conducting at least part of the reheated organic phase back into said extractor vessel.

26. Apparatus in accordance with claim 24, also comprising:
  (a) means for conducting cooled organic liquid from the top of said brine preheater vessel into said separator means to cool the hot water phase therein and to be reheated itself to a temperature below that of said complex;
  (b) means for conducting organic liquid from said separator to said heat exchange means as the coolant therefor;
  (c) means for reheating said organic liquid coolant; and
  (d) means for delivering at least part of the reheated organic liquid to said extractor vessel.

27. Apparatus in accordance with claim 26, also comprising means for delivering part of the reheated organic liquid to said brine preheater vessel.

28. Apparatus in accordance with claim 26, also comprising means for delivering part of the cooled organic liquid from the top of said brine preheater vessel into said extractor vessel near the bottom thereof for cooling the concentrated hot brine therein.

29. Apparatus in accordance with claim 24, wherein said heater vessel and said extractor vessel are arranged in axially aligned end-to-end relationship forming a single column, said heater vessel being above said extractor vessel, and wherein a downcomer extends down into said extractor vessel to a point below the top thereof.

References Cited by the Examiner
UNITED STATES PATENTS
2,298,791  10/1942  Harrington _____ 208—311

OTHER REFERENCES
Report No. 22: Research on Liquid-Liquid Extraction for Saline Water Conversion, United States Department of Interior, December 1958, pp. 2–6 relied on.

MORRIS O. WOLK, *Primary Examiner.*
E. G. WHITBY, *Assistant Examiner.*